(12) United States Patent
Tagami et al.

(10) Patent No.: US 11,912,351 B2
(45) Date of Patent: Feb. 27, 2024

(54) STEERING CONTROL DEVICE AND STEERING DEVICE

(71) Applicant: SHOWA CORPORATION, Gyoda (JP)

(72) Inventors: Kyouichi Tagami, Haga-gun (JP); Ken Isshiki, Haga-gun (JP); Nobuyuki Enomoto, Haga-gun (JP); Eishi Ishimaru, Haga-gun (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 802 days.

(21) Appl. No.: 16/996,430

(22) Filed: Aug. 18, 2020

(65) Prior Publication Data

US 2020/0377149 A1 Dec. 3, 2020

Related U.S. Application Data

(63) Continuation of application No. PCT/JP2018/032868, filed on Sep. 5, 2018.

(30) Foreign Application Priority Data

Jun. 29, 2018 (JP) .................................. 2018-124557

(51) Int. Cl.
*B62D 5/04* (2006.01)
*B62D 6/10* (2006.01)

(52) U.S. Cl.
CPC ............. *B62D 5/0463* (2013.01); *B62D 6/10* (2013.01)

(58) Field of Classification Search
CPC ................................ B62D 5/0463; B62D 6/10
See application file for complete search history.

(56) References Cited

U.S. PATENT DOCUMENTS

| | | |
|---|---|---|
| 2015/0353124 A1 | 12/2015 | Chai et al. |
| 2019/0359203 A1 | 11/2019 | Isshiki et al. |
| 2019/0359250 A1 | 11/2019 | Isshiki et al. |

FOREIGN PATENT DOCUMENTS

| | | | |
|---|---|---|---|
| DE | 112017007310 T5 | 12/2019 | |
| JP | 11-321685 A | 11/1999 | |
| JP | 2006-088983 A | 4/2006 | |
| JP | 2007-269251 A | 10/2007 | |
| JP | 2007269251 A | * 10/2007 | |
| JP | 2010-100079 A | 5/2010 | |
| JP | 6273059 B1 | * 1/2018 | ............ B60W 10/20 |

(Continued)

OTHER PUBLICATIONS

International Search Report dated Nov. 20, 2018 for the corresponding International Patent Application No. PCT/JP2018/032868.

(Continued)

*Primary Examiner* — Jacob D Knutson
(74) *Attorney, Agent, or Firm* — Leason Ellis LLP; Edward J. Ellis; Melvin C. Garner

(57) ABSTRACT

A steering control device which applies an assist torque or a reaction torque to a steering member operated by a driver, includes: a torque loss estimation unit which estimates torque loss; and a correction amount calculation unit which calculates a correction amount according to a rack axial force estimation value calculated based on a roll rate when the torque loss estimation unit estimates the torque loss.

20 Claims, 7 Drawing Sheets

(56) References Cited

FOREIGN PATENT DOCUMENTS

| | | | |
|---|---|---|---|
| JP | 6279121 B1 * | 2/2018 | ........... B62D 5/0463 |
| JP | 6328841 B1 | 5/2018 | |
| WO | WO-2014/108983 A1 | 7/2014 | |

OTHER PUBLICATIONS

German Office Action dated Aug. 30, 2023 for the corresponding German Patent Application No. 112018006928.1 (7 pages including English translation).

* cited by examiner

STEERING CONTROL DEVICE AND STEERING DEVICE

CROSS-REFERENCE TO RELATED APPLICATION(S)

This application is a continuation of PCT application No. PCT/JP2018/032868 filed on Sep. 5, 2018, which claims the benefit of priority to Japanese Patent Application No. 2018-124557 filed on Jun. 29, 2018, the contents of which are incorporated herein by reference.

FIELD OF THE INVENTION

The present invention relates to a steering control device and a steering device which apply an assist torque or a reaction torque to a steering member.

BACKGROUND OF THE INVENTION

A steering device which applies an assist torque or a reaction torque to a steering member has been known. In a steering device, a technique (Patent Literature 1) of estimating a rack axial force at the time of turning a tire from a steering angle and a vehicle speed is known.

Patent Literature 1: Japanese Unexamined Patent Publication "JP-A-2010-100079" (published on May 6, 2010)

In a control device which applies an assist torque or a reaction torque to a steering member, it is preferable to apply an assist torque or a reaction torque which causes less discomfort to a driver of a vehicle to the steering member.

An object of the invention is to apply an assist torque or a reaction torque with less discomfort to a driver in a control device which applies an assist torque or a reaction torque to a steering member.

SUMMARY OF THE INVENTION

With such objective in mind, the invention provides a steering control device for applying an assist torque or a reaction torque to a steering member operated by a driver, which includes a torque loss estimation unit for estimating torque loss, and a correction amount calculation unit which calculates a correction amount according to a rack axial force estimation value calculated based on a roll rate when the torque loss estimation unit estimates the torque loss.

With such objective in mind, the invention provides a steering device which includes a steering member operated by a driver and a steering control unit for applying an assist torque or a reaction torque to the steering member, where the steering control unit includes a torque loss estimation unit for estimating torque loss and a correction amount calculation unit which calculates a correction amount according to a rack axial force estimation value calculated based on a roll rate when the torque loss estimation unit estimates the torque loss.

According to the invention, it is possible to apply an assist torque or a reaction force torque which causes less discomfort to a driver.

BRIEF DESCRIPTION OF THE DRAWINGS

FIG. 6A illustrates a vehicle state at the time of going straight, FIG. 6B illustrates a vehicle state at the time of turning roll, and FIG. 6C illustrates a relationship between a roll angle and a suspension stroke.

FIG. 7A illustrates a relationship between a cornering force and a tire lateral force and FIG. 7B illustrates a relationship with a rack axial force.

DETAILED DESCRIPTION OF THE INVENTION

First Embodiment

Hereinafter, a first embodiment of the invention will be described in detail.

(Configuration of Vehicle 900)

Figure 1:
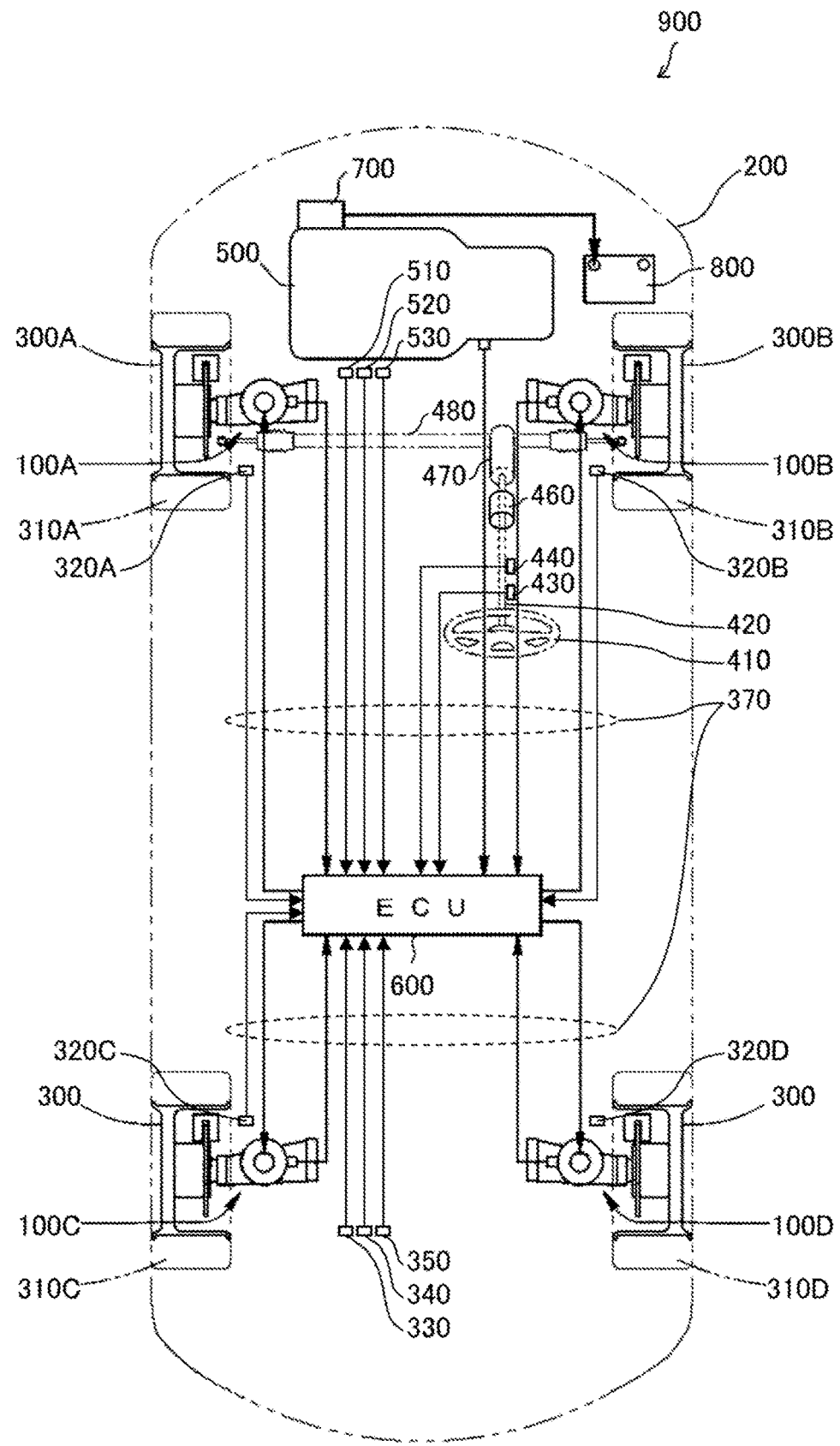
FIG. 1 is a diagram illustrating a schematic configuration of a vehicle according to a first embodiment of the invention.

FIG. 1 is a diagram illustrating a schematic configuration of a vehicle 900 according to the embodiment. As illustrated in FIG. 1, the vehicle 900 includes a suspension device (suspension) 100, a vehicle body 200, wheels 300, tires 310, a steering member 410, a steering shaft 420, a torque sensor 430, a steering angle sensor 440, a torque application unit 460, a rack and pinion mechanism 470, a rack shaft 480, an engine 500, an electronic control unit (ECU) (control device) 600, a power generator 700, and a battery 800.

The wheel 300 on which the tire 310 is mounted is suspended on the vehicle body 200 by the suspension device 100. Since the vehicle 900 is a four-wheeled vehicle, four suspension devices 100, four wheels 300, and four tires 310 are provided.

The tires and wheels of the left front wheel, right front wheel, left rear wheel, and right rear wheel are also referred to as a tire 310A and a wheel 300A, a tire 310B and a wheel 300B, a tire 310C and a wheel 300C, and a tire 310D and a wheel 300D. Hereinafter, similarly, configurations associated with the left front wheel, the right front wheel, the left rear wheel, and the right rear wheel may be represented by reference letters "A", "B", "C", and "D".

The suspension device 100 includes a hydraulic shock absorber, an upper arm, and a lower arm. The hydraulic shock absorber includes a solenoid valve which is an electromagnetic valve which adjusts a damping force generated by the hydraulic shock absorber. However, this does not limit the embodiment and the hydraulic shock absorber may use an electromagnetic valve other than the solenoid valve as the electromagnetic valve for adjusting the damping force. For example, the electromagnetic valve may include an electromagnetic valve using an electromagnetic fluid (magnetic fluid).

The power generation device 700 is attached to the engine 500 and the power generated by the power generation device 700 is stored in the battery 800.

The steering member 410 operated by a driver is connected to one end of the steering shaft 420 to be able to transmit torque and the other end of the steering shaft 420 is connected to the rack and pinion mechanism 470.

The rack and pinion mechanism 470 is a mechanism for converting rotation around an axis of the steering shaft 420 into displacement along an axial direction of the rack shaft 480. When the rack shaft 480 is displaced in the axial direction, the wheels 300A and 300B are steered via the tie rods and the knuckle arms The torque sensor 430 detects a steering torque applied to the steering shaft 420, in other words, a steering torque applied to steering member 410, and provides a torque sensor signal indicating the detection result to the ECU 600. More specifically, the torque sensor 430 detects the torsion of a torsion bar provided inside the steering shaft 420 and outputs the detection result as a torque sensor signal. A well-known sensor such as a hall IC, an MR element, or a magnetostrictive torque sensor may be used as the torque sensor 430.

The steering angle sensor 440 detects the steering angle of the steering member 410 and provides the detection result to the ECU 600.

The torque application unit 460 applies an assist torque or a reaction torque corresponding to the steering control amount supplied from the ECU 600 to the steering shaft 420. The torque application unit 460 includes a motor which generates an assist torque or a reaction torque according to the steering control amount and a torque transmission mechanism which transmits the torque generated by the motor to the steering shaft 420.

Specific examples of the "control amount" in this specification include a current value, a duty ratio, an attenuation rate, an attenuation ratio, and the like.

The steering member 410, the steering shaft 420, the torque sensor 430, the steering angle sensor 440, the torque application unit 460, the rack and pinion mechanism 470, the rack shaft 480, and the ECU 600 configure a steering device according to the embodiment.

In the above description, "connected to be able to transmit torque" indicates that the connection is performed such that rotation of one member causes rotation of the other member and includes, for example, at least a case where one member and the other member are integrally formed, a case where the one member is directly or indirectly fixed to the other member, and a case where one member and the other member are connected to interlock via a joint member or the like.

In the above example, the steering device in which the steering member 410 to the rack shaft 480 are always mechanically connected has been described as an example. However, this does not limit the embodiment and the steering device according to the embodiment may be, for example, a steer-by-wire type steering device. The matters described below in the present specification can also be applied to a steer-by-wire type steering device.

The ECU 600 controls various electronic devices included in the vehicle 900. More specifically, the ECU 600 controls the amount of assist torque or reaction torque applied to steering shaft 420 by adjusting the steering control amount supplied to the torque application unit 460.

The ECU 600 controls the opening and closing of the solenoid valve by supplying a suspension control amount to a solenoid valve included in the hydraulic shock absorber included in the suspension device 100. In order to enable such control, a power line for supplying drive power from the ECU 600 to the solenoid valve is provided.

The vehicle 900 includes a wheel speed sensor 320 provided for each wheel 300 to detect the wheel speed of each wheel 300, a lateral G sensor 330 for detecting the lateral acceleration of the vehicle 900, a longitudinal G sensor 340 for detecting the longitudinal acceleration of the vehicle 900, a yaw rate sensor 350 for detecting the yaw rate of the vehicle 900, an engine torque sensor 510 for detecting the torque generated by the engine 500, an engine speed sensor 520 for detecting the speed of the engine 500, and a brake pressure sensor 530 for detecting pressure applied to the brake fluid of the brake device. The detection results of various sensors are supplied to the ECU 600.

The vehicle 900 may further include a roll rate sensor which detects a roll rate of the vehicle body 200, a stroke sensor which detects a stroke of each suspension, and a roll angle sensor which detects a roll angle of the vehicle body 200.

Although illustration is omitted, the vehicle 900 includes a brake device which can control with the vehicle stability assist (VSA), which is a vehicle behavior stabilization control system including an antilock brake system (ABS), which is a system to prevent wheel lock during braking, a traction control system (TCS), which reduces wheel spin during acceleration or the like, and an automatic braking function for yaw moment control and the brake assist function during turning.

Here, the ABS, TCS, and VSA compare the wheel speed determined according to the estimated vehicle body speed with the wheel speed detected by the wheel speed sensor 320 and determine that the vehicle is in a slip state when the two wheel speed values are different from each other by a predetermined value or more. The ABS, TCS, and VSA stabilize the behavior of the vehicle 900 by performing optimal brake control and traction control according to the running state of the vehicle 900 through such processing.

The supply of the detection results by the various sensors to the ECU 600 and the transmission of control signals from the ECU 600 to each unit are performed via a controller area network (CAN) 370.

(ECU 600)

Figure 2:
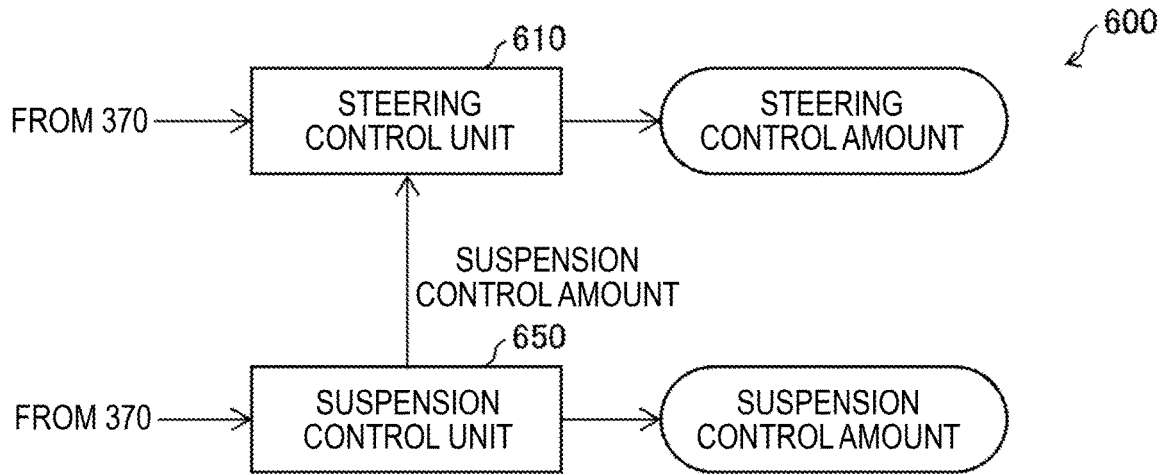
FIG. 2 is a block diagram illustrating a schematic configuration of an ECU according to the first embodiment of the invention.

Hereinafter, the ECU 600 will be specifically described with reference to different drawings. FIG. 2 is a diagram illustrating a schematic configuration of the ECU 600.

A steering control unit 610 refers to various sensor detection results included in the CAN 370 and determines the magnitude of the steering control amount to be supplied to the torque application unit 460.

In the present specification, the expression "with reference to" may include meanings such as "using", "considering", and "dependent on".

A suspension control unit 650 refers to various sensor detection results included in the CAN 370 and determines the magnitude of the suspension control amount to be supplied to the solenoid valve included in the hydraulic shock absorber included in the suspension device 100.

As illustrated in FIG. 2, in the ECU 600, the suspension control amount calculated by the suspension control unit 650 is supplied to the steering control unit 610 and is referred for determining the magnitude of the steering control amount.

The roll rate value may be configured to take "0" as a reference value when the inclination of the vehicle 900 does not change for a predetermined minute time and may represent the roll rate as a deviation from the reference value.

The process of "determining the magnitude of the control amount" includes a case where the magnitude of the control amount is set to zero, that is, a case where the control amount is not supplied.

The steering control unit 610 and the suspension control unit 650 may be configured as separate ECUs. In a case of such a configuration, the control described in this specification is realized by the steering control unit 610 and the suspension control unit 650 communicating with each other using a communication unit.

(Steering Control Unit)

Figure 3:
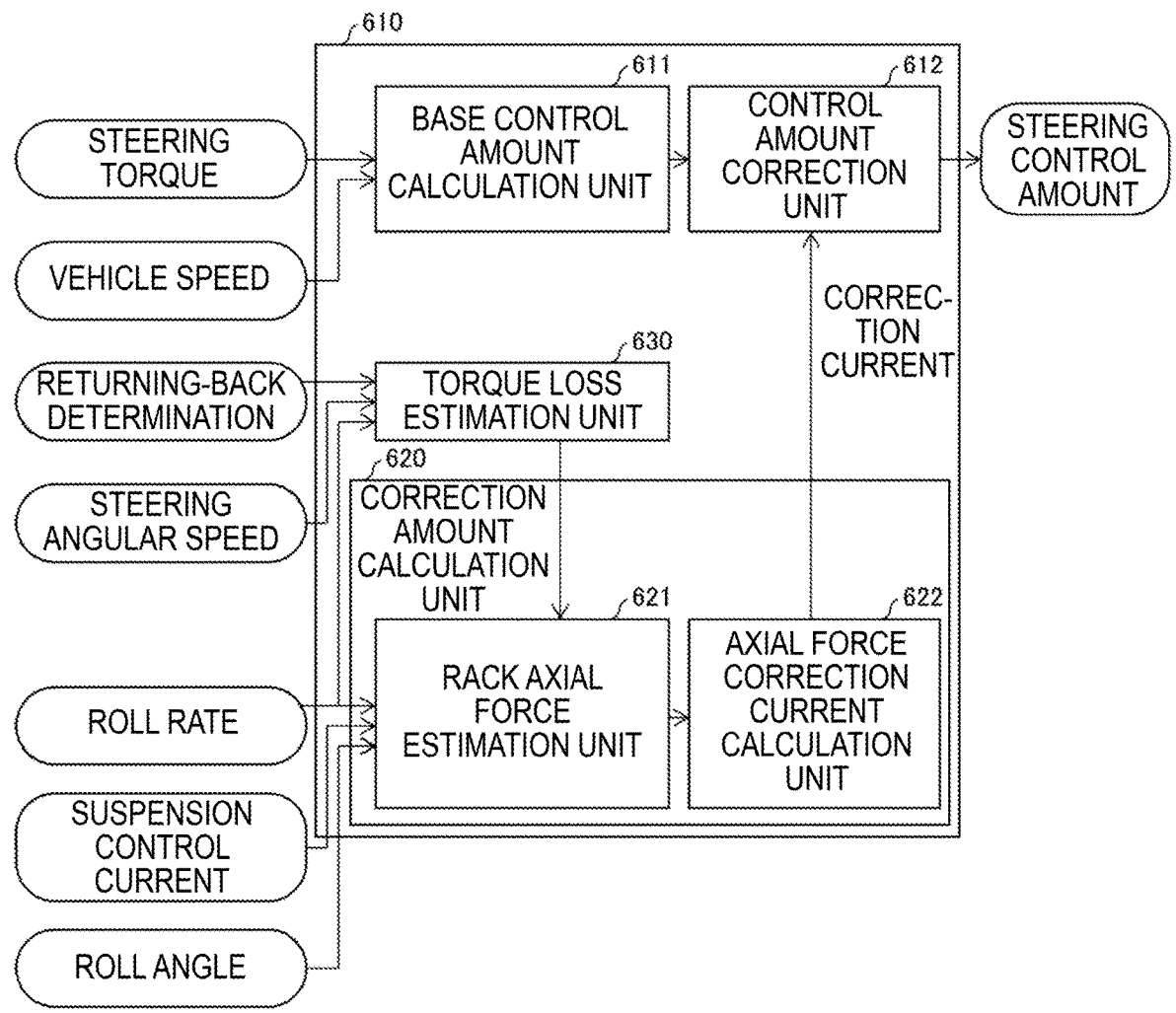
FIG. 3 is a block diagram illustrating a configuration example of a steering control unit according to the first embodiment of the invention.

Subsequently, the steering control unit 610 will be described more specifically with reference to FIG. 3. FIG. 3 is a block diagram illustrating a configuration example of the steering control unit 610. As illustrated in FIG. 3, the steering control unit 610 includes a base control amount calculation unit 611, a control amount correction unit 612, a correction amount calculation unit 620, and a torque loss estimation unit 630.

The base control amount calculation unit 611 refers to the steering torque supplied from the torque sensor 430 and the vehicle speed determined according to the wheel speed detected by the wheel speed sensor 320 and calculates a control amount for controlling the magnitude of the assist torque or the reaction torque. The control amount calculated by the base control amount calculation unit 611 is corrected by the control amount correction unit 612, and then supplied to the torque application unit 460 as a steering control amount.

(Correction Amount Calculation Unit)

Figure 4:
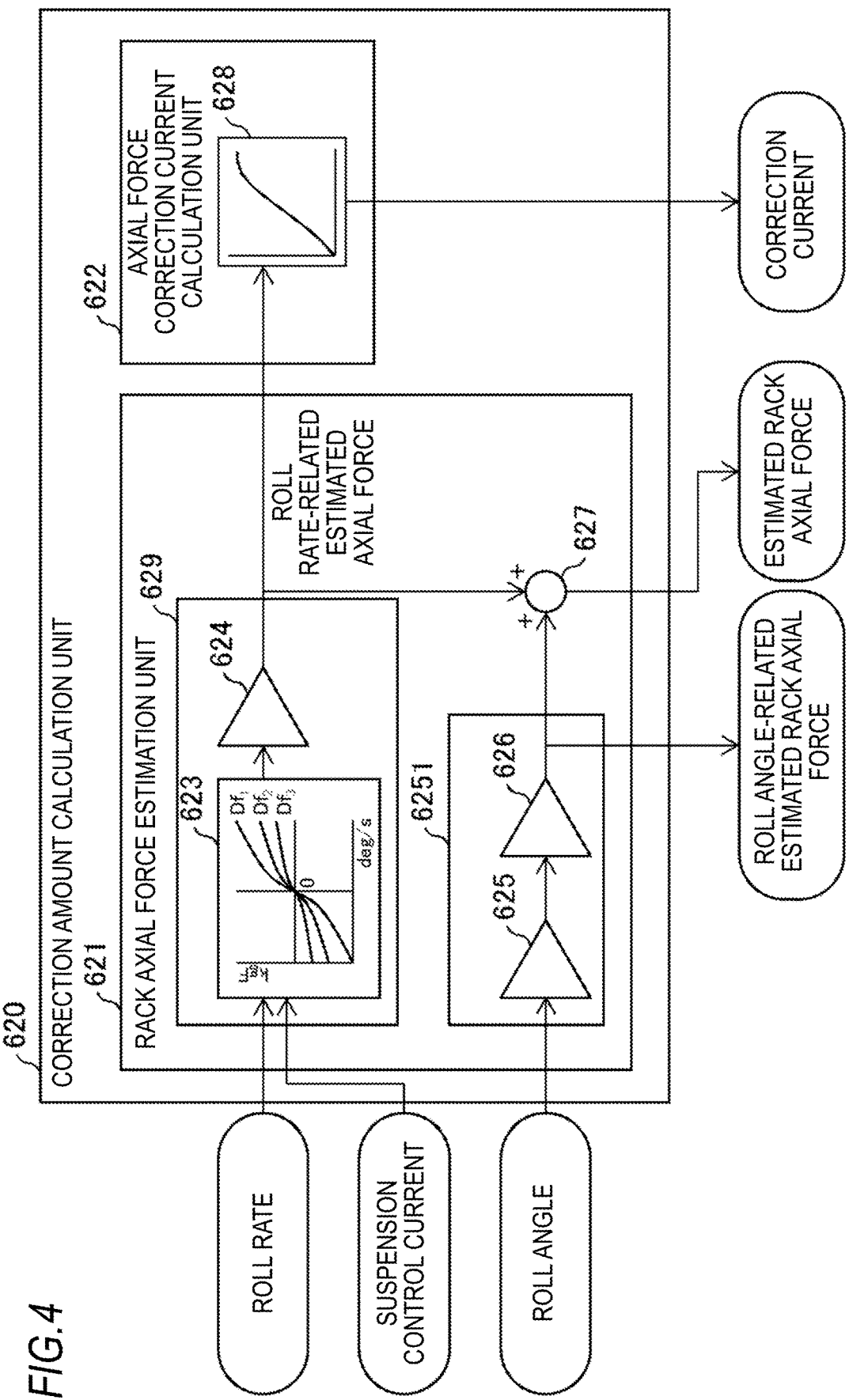
FIG. 4 is a block diagram illustrating a configuration example of a correction amount calculation unit according to the first embodiment of the invention.

Next, the correction amount calculation unit 620 will be described more specifically with reference to FIG. 4. FIG. 4 is a block diagram illustrating a configuration example of the correction amount calculation unit 620.

As illustrated in FIG. 4, the correction amount calculation unit 620 includes a rack axial force estimation unit 621 and an axial force correction current calculation unit 622. When a determination result (determination result that the estimated torque loss is not 0) that a torque loss is estimated is input from the torque loss estimation unit 630 described below, the correction amount calculating unit 620 causes the rack axial force estimation unit 621 to estimate a roll rate-related estimated rack axial force which is a rack axial force estimated value calculated based on the roll rate. The correction amount calculation unit 620 calculates a correction amount according to the roll rate-related estimated rack axial force. As described above, the correction amount calculation unit 620 according to the embodiment is configured to calculate the correction amount when a torque loss is estimated. The correction amount calculation unit 620 calculates the correction amount so that the reaction torque applied to the steering member 410 increases when the torque loss is estimated.

(Rack Axial Force Estimation Unit)

The rack axial force estimation unit 621 estimates the rack axial force with reference to the roll rate supplied from the roll rate sensor. The rack axial force estimation unit 621 may estimate the rack axial force with reference to the sensor value supplied from the stroke sensor and the roll angle supplied from the roll angle sensor.

As illustrated in FIG. 4, the rack axial force estimation unit 621 includes a roll rate-related suspension damping force estimation unit 623, a first constant gain application unit 624, a roll angle-related suspension damping force estimation unit 625, a second constant gain application unit 626, and an adding unit 627.

The roll rate-related suspension damping force estimation unit 623 and the first constant gain application unit 624 may be collectively referred to as a roll rate-related rack axial force estimation unit 629.

The roll angle-related suspension damping force estimation unit 625 and the second constant gain application unit 626 may be collectively referred to as a roll angle-related rack axial force estimation unit 6251.

The roll rate-related rack axial force estimation unit 629 estimates the roll rate-related estimated rack axial force with reference to the roll rate supplied from the roll rate sensor. The roll rate-related rack axial force estimation unit 629 may further estimate the roll rate-related estimated rack axial force with reference to the suspension control amount. Here, in the specification, a value related to the damping coefficient such as a suspension control current, which is a control amount for controlling the damping coefficient of the suspension, and a sensor value of the stroke sensor is referred to as a damping coefficient-related value. In other words, the correction amount calculation unit 620 according to the embodiment calculates the correction amount according to the roll rate-related estimated rack axial force with reference to the roll rate and the damping coefficient-related value.

Here, the damping coefficient is a numerical value of a damping characteristic, which is a characteristic indicating a relationship between the stroke speed of the damper and the damping force and the damping force is a resistance force against pushing and pulling the hydraulic shock absorber.

The roll rate-related suspension damping force estimation unit 623 estimates the damping force of the suspension according to the roll rate with reference to the roll rate map illustrated in FIG. 4. The roll rate map is a map in which the roll rate is input and the estimated value of the suspension damping force according to the roll rate is output. In the roll rate map, a horizontal axis indicates the roll rate, and a vertical axis indicates the damping force of the suspension. In FIG. 4, $Df_1$ to $Df_3$ indicate suspension control current values as suspension control amounts. The $Df_1$ to $Df_3$ can be said to be values related to an attenuation coefficient. Thus, the roll rate-related suspension damping force estimation unit 623 refers to different roll rate maps according to the value of the suspension control amount. The roll rate-related suspension damping force estimation unit 623 refers to the roll rate map, calculates an estimated value of the suspension damping force based on the roll rate, and outputs the calculated estimated value of the suspension damping force to the first constant gain application unit 624.

The first constant gain application unit 624 applies a gain corresponding to the vehicle 900 to the estimated value of the suspension damping force supplied from the roll rate-related suspension damping force estimation unit 623 and calculates a roll rate-related estimated rack axial force. More specifically, the roll rate-related suspension damping force supplied from the roll rate-related suspension damping force estimation unit 623 is multiplied by a correction coefficient corresponding to the vehicle 900. Examples of the correction coefficient according to the vehicle 900 include a gain according to a caster angle β, a knuckle length Lkn, a tread width TW, a height of the center of gravity Hg, and the like. The first constant gain application unit 624 supplies the roll rate-related estimated rack shaft force to the adding unit 627 and the axial force correction current calculation unit 622.

Here, the roll rate-related suspension damping force estimation unit 623 calculates and outputs a suspension damping force estimated value which is larger as the suspension control current is larger.

That is, the roll rate-related rack axial force estimation unit 629 can calculate and output a roll rate-related estimated rack axial force which is larger as the suspension control current is larger.

The roll angle-related rack axial force estimation unit 6251 refers to the roll angle supplied from the roll angle sensor to estimate the roll angle-related estimated rack axial force. More specifically, the roll angle-related suspension damping force estimation unit 625 in the roll angle-related rack axial force estimation unit 6251 refers to the roll angle supplied from the roll angle sensor and estimates the roll angle-related damping force, which is the damping force of the suspension according to the roll angle.

The second constant gain application unit 626 applies a gain according to the vehicle 900 to the roll angle-related estimated damping force supplied from the roll angle-related suspension damping force estimation unit 625 to calculate a roll angle-related rack axial force. More specifically, the roll angle-related estimated damping force supplied from the roll angle-related suspension damping force estimation unit 625 is multiplied by a correction coefficient corresponding to vehicle 900. The second constant gain application unit 626 supplies the roll angle-related estimated rack axial force to which the gain has been applied to the adding unit 627.

The adding unit 627 adds the roll rate-related estimated rack axial force supplied from the first constant gain application unit 624 and the roll angle-related estimated rack axial force supplied from the second constant gain application unit 626 to calculate the roll-related estimated rack axial force. The calculated roll-related estimated rack axial force may be used for steering control. The adding unit 627 is configured to add the roll rate-related estimated rack axial force, which is the estimated rack axial force, and the estimated roll angle-related estimated rack axial force and calculate the estimated rack axial force. Therefore, the adding unit 627 can be referred to as a role-related rack axial force estimation unit.

(Axial Force Correction Current Calculation Unit)

As illustrated in FIG. 4, the axial force correction current calculation unit 622 includes a current map 628. The axial force correction current calculation unit 622 calculates a correction current with reference to the current map 628. The current map 628 is a map in which the roll rate-related estimated rack axial force supplied from the first constant gain application unit 624 is input and the correction current is output. In the current map 628, the horizontal axis represents the value of the roll rate-related estimated rack axial force and the vertical axis represents the value of the correction current. The axial force correction current calculation unit 622 calculates and outputs a correction current based on the roll rate-related estimated rack axial force by referring to the current map 628.

The control amount correction unit 612 corrects the control amount calculated by the base control amount calculation unit 611 with the correction current supplied from the correction amount calculation unit 620. In other words, the control amount correction unit 613 corrects the control amount calculated by the base control amount calculation unit 611 with reference to the rack axial force estimated by the rack axial force estimation unit 621.

(Torque Loss Estimation Unit)

Next, the torque loss estimation unit 630 according to the present embodiment will be described with reference to FIG. 5.

Figure 5:
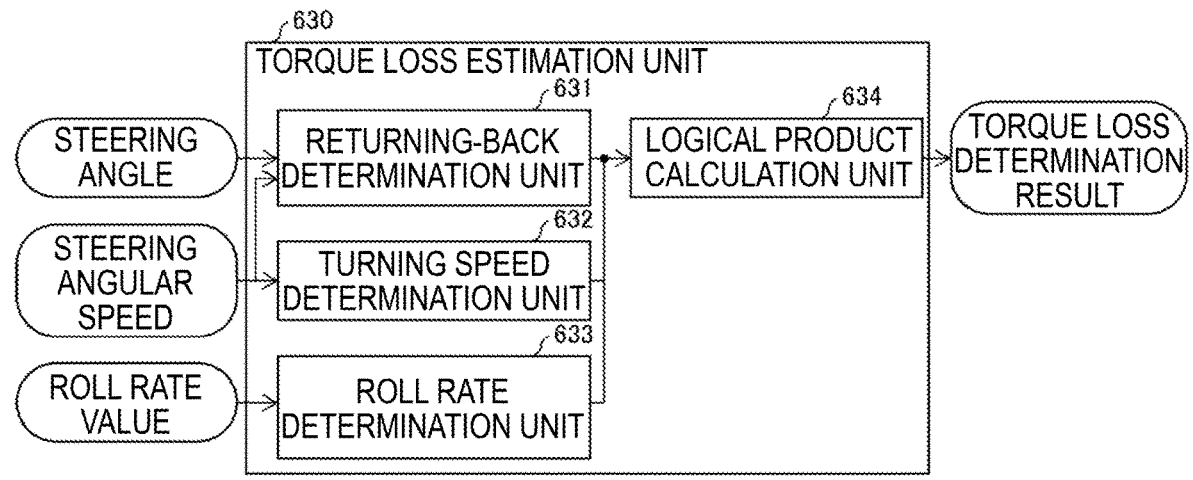
FIG. 5 is a block diagram illustrating a configuration example of a torque loss estimation unit according to the first embodiment of the invention.

FIG. 5 is a block diagram illustrating a configuration example of the torque loss estimation unit according to the embodiment. As illustrated in FIG. 5, the torque loss estimation unit 630 includes a returning-back determination unit 631, a turning speed determination unit 632, a roll rate determination unit 633, and a logical product calculation unit 634. The torque loss estimation unit 630 estimates torque loss with reference to the roll rate, the steering angle, and the steering angular speed.

The returning-back determination unit 631 determines whether the steering member 410 is in the turning back state by referring to the steering angle supplied from the steering angle sensor 440 and the steering angular speed calculated with reference to the steering angle. When the steering member 410 is in the turning back state, the returning-back determination unit 631 outputs "1" as a determination result, and otherwise outputs "0" as a determination result. It may be configured such that the vehicle 900 includes a steering angular velocity sensor and the returning-back determination unit 631 determines whether the steering member 410 is in the turning back state by referring to the steering angle supplied from the steering angle sensor 440 and the steering angular speed supplied from the steering angular speed sensor.

The determination process of the turning back state by the returning-back determination unit 631 is not limited to the example described above. The returning-back determination unit 631 may be configured to determine whether the vehicle is in the turning back state by referring to the torque sensor signal indicating the detection result of the torque sensor 430 and the rotation direction of the motor included in the torque application unit 460. In the present configuration, for example, when the sign of the torque sensor signal and the sign of the rotation direction of the motor are different, it may be configured to determine that the vehicle is in the turning back state Here, the sign of the torque sensor signal is, for example, a plus sign of the torque sensor signal when the torsion bar is twisted in the clockwise direction and a minus sign of the torque sensor signal when the torsion bar is twisted in the counterclockwise direction. In a case of the sign of the rotation direction of the motor, when the torsion bar is twisted in the clockwise direction, a direction in which the torsion bar twist is eliminated is set as a plus direction, and when the torsion bar is twisted in the counterclockwise direction, a direction in which the torsion bar twist is eliminated is set as a plus.

The turning speed determination unit 632 determines whether the steering angular speed calculated with reference to the steering angle supplied from the steering angle sensor 440 or its absolute value is equal to or greater than a predetermined value. The turning speed determination unit 632 outputs "1" as a determination result when the steering angular speed or its absolute value is equal to or more than a predetermined value and outputs "0" as a determination result otherwise.

The roll rate determination unit 633 determines whether the roll rate value supplied from the roll rate sensor or its absolute value is less than a predetermined value. Here, the predetermined value is, for example, 0.06 rad/s. The roll rate determination unit 633 outputs "1" as a determination result when the roll rate value or its absolute value is less than a predetermined value and outputs "0" as a determination result otherwise.

The logical product calculation unit 634 takes the logical product of the determination results from the returning-back determination unit 631, the turning speed determination unit 632, and the roll rate determination unit 633 and outputs the result. In other words, the logical product calculation unit 634 outputs "1" when the determination results output by the returning-back determination unit 631, the turning speed determination unit 632, and the roll rate determination unit 633 are all "1" and outputs "0" otherwise.

The torque loss estimation unit 630 estimates torque loss when the determination result output by the logical product calculation unit 634 is "1" and does not estimate torque loss when the determination result output by the logical product calculation unit 634 is "0". As described above, the torque loss estimation unit 630 estimates the torque loss when the steering angular speed is equal to or higher than a predetermined value and the roll rate is lower than a predetermined value in the turning back state. In other words, the torque loss estimation unit 630 estimates the torque loss with reference to the roll rate, the steering angle, and the steering angular speed.

The steering control unit 610 according to the embodiment can estimate the direction in which vehicle body 200 is rolling by estimating the rack axial force with reference to the roll rate of the vehicle body 200 when the torque loss estimation unit 630 estimates torque loss. Therefore, transient roll changes of the vehicle body 200 can be identified. As described above, the control amount correction unit 612 corrects the control amount calculated by the base control amount calculation unit 611 according to the roll change in the transition state of the vehicle body 200, thereby it is possible to apply the assist torque or the reaction force torque with less discomfort to a driver to the steering member 410.

(Method of Calculating Estimated Rack Axial Force)

Subsequently, a method of calculating the estimated rack axial force will be described more specifically with reference to FIGS. 6 and 7. First, with reference to FIGS. 6A to 6C, a mechanism from the viewpoint of a change in vehicle motion when a roll motion occurs will be described.

Figure 6A:
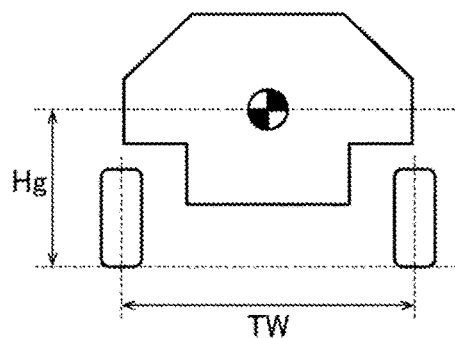
FIGS. 6A to 6C are diagrams illustrating a mechanism related to a change in vehicle motion when a roll motion occurs, where
Figure 6B:
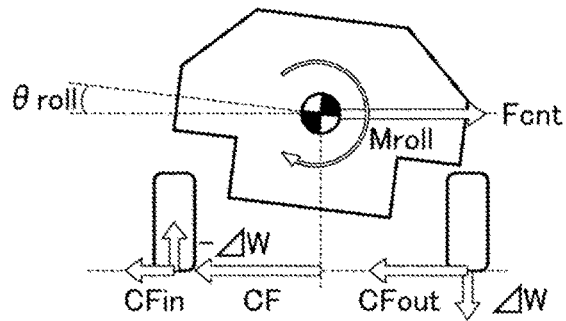
Figure 6C:
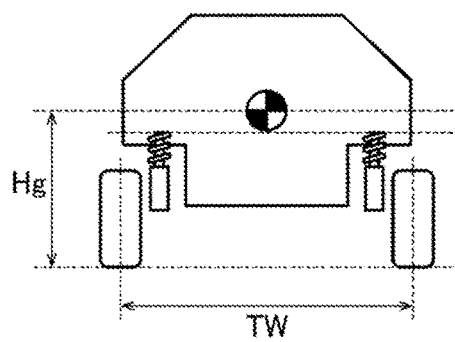
Figure 6C:
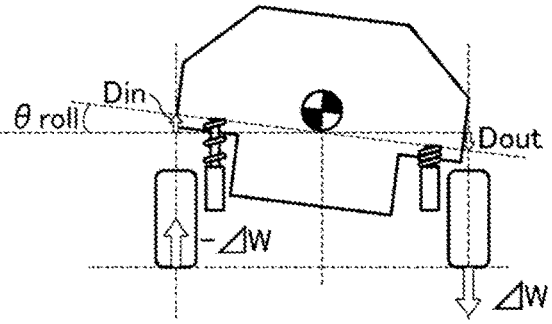

FIGS. 6A to 6C are diagrams illustrating a mechanism related to a change in vehicle motion when a roll motion occurs, where FIG. 6A illustrates a vehicle state at the time of going straight, FIG. 6B illustrates a vehicle state at the time of turning roll, and FIG. 6C illustrates a relationship between a roll angle and a suspension stroke.

As illustrated in FIGS. 6A to 6C, in the vehicle state at the time of the turning roll, in other words, in the vehicle state of the vehicle 900 in which a driver operates the steering member 410, a tire cornering force, a lateral G, a centrifugal force, a roll moment, and a load shift occur. Here, in FIGS. 6A to 6C, the height of the center of gravity of the vehicle 900 is Hg [m], the tread width of the vehicle 900 is TW [m], the total cornering force of the four wheels of the vehicle 900 is CF [kgf], the inner ring side cornering force of the vehicle 900 is $CF_{in}$ [kgf], the outer ring side cornering force of the vehicle 900 is $CF_{out}$ [kgf], the centrifugal force is $F_{cnt}$ [kgf], the lateral G is Gy [G], the roll moment is $M_{roll}$ [kgf·m], the load movement is ΔW [kgf], the roll angle is $\theta_{roll}$ [deg], the inner wheel side stroke amount is $D_{in}$ [m], and the outer wheel side stroke amount is $D_{out}$ [m].

As illustrated in FIG. 6B, the centrifugal force of the turning vehicle 900 and the tire cornering force are in balance and are expressed by the following equation (1).

[Expression 1]

$$Fcnt[kgf] = Wcar[kg] \times Gy[G'] \qquad (1)$$
$$= CF[kgf]$$

The roll moment is represented by the following equations (2) and (3).

[Expression 2]

$$Mroll[kgfm] = CF[kgf] \times Hg[m] \qquad (2)$$

$$Mroll[kgfm] = 2 \times (\Delta W[kg] \times TW/2[m]) \qquad (3)$$

The following equation (4) is obtained by simultaneously combining the above equations (2) and (3) for $M_{roll}$.

[Expression 3]

$$\Delta W[kgf] = Mroll[kgfm] \div TW[m] = \frac{CF[kgf] \times Hg[m]}{TW[m]} \qquad (4)$$

When the distribution of the load between the front wheel and the rear wheel is a: b, the load applied to each wheel is as follows.

Load of front inner wheel=½×a×Wcar−a×ΔW

Load of front outer wheel=½×a×Wcar+a×ΔW

Load of rear inner wheel=½×b×Wcar−b×ΔW

Load of rear outer wheel=½×b×Wcar+b×ΔW    [Expression 4]

$W_{car}$ indicates the weight of the vehicle 900, ½×a×$W_{car}$ and ½×a×$W_{car}$ indicate the load amounts in the 1G state, and −a×ΔW, −b×ΔW, a×ΔW, and b×ΔW indicate the load shift amounts.

As illustrated in FIG. 6C, the roll angle according to the stroke of the suspension 100 on the inner and outer wheels is expressed by the following equation (5).

[Expression 5]

$$\theta_{roll}[deg] = \tan^{-1}\left(\frac{D_{out}[m] - D_{in}[m]}{TW[m]}\right) \qquad (5)$$

The relational equation between the load movement and the stroke amount is represented by the following equation (6). The following equation (6) represents a relational equation between the load movement on the front wheel side and the stroke amount.

[Expression 6]

$$-a \times \Delta W[kgf] = -DF_{fr} \times \frac{dD_{in}}{dt} - K_{fr} \times D_{in} \quad \ldots \text{ inner wheel side} \qquad (6)$$

$$a \times \Delta W[kgf] = DF_{fr} \times \frac{dD_{out}}{dt} + K_{fr} \times D_{out} \quad \ldots \text{ outer wheel side}$$

$DF_{fr}$ represents a front wheel damping coefficient [kgfs/m] and $K_{fr}$ represents a front wheel spring coefficient [kgf/m].

When the stroke amount of the extension and the stroke amount of the contraction of the suspension 100 in the inner and outer wheels are equivalent to each other on the left and right sides, it is expressed by the following equation (7).

[Expression 7]

$$-D_{in} \approx D_{out} \approx D_{eq} \quad (7)$$

$D_{eq}$ represents an equivalent stroke amount [m].

The following equation (8) is obtained by applying the above equation (7) to the above equation (5) and approximating the trigonometric function to a straight line.

[Expression 8]

$$\theta_{roll}[\text{deg}] = \tan^{-1}\left(\frac{2D_{eq}[m]}{TW[m]}\right) \quad (8)$$

$$D_{eq}[m] = \frac{\tan(\theta_{roll}[\text{deg}]) \times TW[m]}{2} \cong K_{tan}[1/\text{deg}] \times \theta_{roll}[\text{deg}] \times \frac{TW[m]}{2}$$

The following equation (9) is obtained by applying the above equation (7) to the above equation (6).

[Expression 9]

$$a \times \Delta W = DF_{fr} \times \frac{dD_{eq}}{dt} + K_{fr} \times D_{eq} \quad (9)$$

$$= DF_{fr} \times \frac{K_{tan} \times TW[m]}{2} \times \frac{d}{dt}(\theta_{roll}[\text{deg}]) +$$

$$K_{fr} \times \frac{K_{tan} \times TW[m]}{2} \times \theta_{roll}[\text{deg}]$$

The following equation

[Expression 10]

$$\frac{d}{dt}(\theta_{roll}[\text{deg}]) = \omega_{roll}[\text{deg/sec}]$$

indicates a roll rate.

Here, since the damping coefficient $DF_{fr}$ is determined by the stroke speed and the current according to the damper characteristics, in the above equation (9),

[Expression 11]

$$DF_{fr} \times \frac{K_{tan} \times TW[m]}{2} \times \frac{d}{dt}(\theta_{roll}[\text{deg}])$$

is replaced with $$f_{DFfr}(\omega, i) \quad \text{[Expression 12]}$$

In the above equation (9),

[Expression 13]

$$\frac{d}{dt}(\theta_{roll}[\text{deg}]) = \omega_{roll}[\text{deg/sec}] \cdot \frac{K_{tan} \times TW[m]}{2} = K_1$$

The two equations are exchanged, and the equation is arranged to obtain the following equation (10).

[Expression 14]

$$a \times \Delta W = f_{DFr}(K_1 \times \omega_{roll}[\text{deg/sec}], i_{Dfr}) + K_{fr} \times K_1 \times \theta_{roll}[\text{deg}] \quad (10)$$

By substituting the above equation (4) into the above equation (10), the following equation (11), which is a relational equation relating to a change in vehicle motion, can be obtained.

[Expression 15]

$$\frac{a \times H_g[m]}{TW[m]} \times CF[kgf] = \quad (11)$$

$$f_{DFfr}(K_1 \times \omega_{roll}[\text{deg/sec}], i_{Dfr}) + K_{fr} \times K_1 \times \theta_{roll}[\text{deg}]$$

Figure 7A:
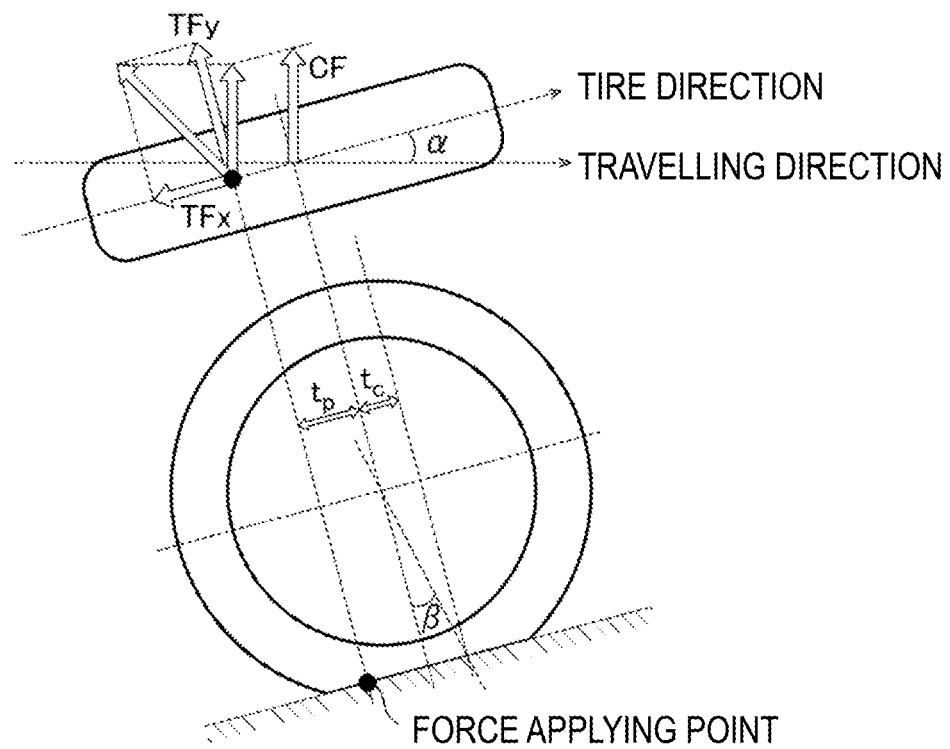
FIGS. 7A and 7B are diagrams illustrating a mechanism related to a change in force when a roll motion occurs, where
Figure 7B:
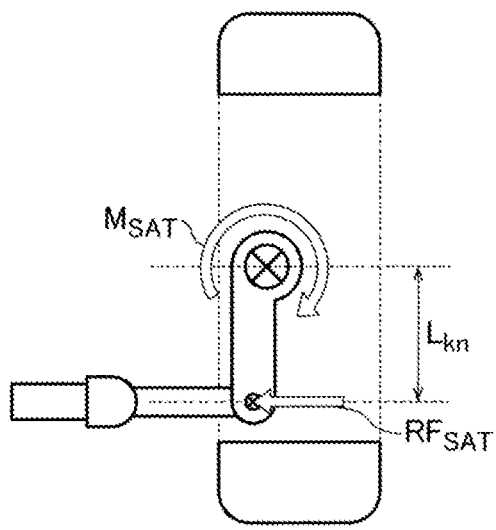

Next, with reference to FIGS. 7A and 7B, a mechanism from the viewpoint of a change in force when a roll motion occurs will be described. FIGS. 7A and 7B are diagrams illustrating a mechanism related to a change in force when a roll motion occurs, where FIG. 7A illustrates a relationship between a cornering force and a tire lateral force and FIG. 7B illustrates a relationship with a rack axial force. Here, in FIGS. 7A and 7B, the cornering force is CF [kgf], the tire lateral force is $TF_y$ [kgf], the side slip angle is α [°], the tire rolling resistance is $TF_x$ [kgf], the pneumatic trail is $t_p$ [m], the caster trail is $t_c$ [m], the caster angle is β [°], the SAT moment (moment due to tire lateral force) is $M_{SAT}$ [kgf·m], the rack axial force is $RF_{SAT}$ [kgf], and the knuckle length is $L_{kn}$ [m].

The relational equation of the cornering force, the tire lateral force, and the rolling resistance is represented by the following equation (12). The pneumatic trail $t_p$ decreases as the sideslip angle α becomes larger than a predetermined value. Due to the decrease in the pneumatic trail $t_p$, the SAT moment $M_{SAT}$ decreases.

[Expression 16]

$$CF[kgf] = TF_y[kgf] \times \cos\alpha - TF_x[kgf] \times \sin\alpha \quad (12)$$

The SAT moment due to the tire lateral force around the kingpin axis is expressed by the following equation (13).

[Expression 17]

$$M_{SAT}[kgfm] = TF_y[kgf] \times (t_p[m] + t_c[m]) \times \sin\beta \quad (13)$$

The rack axial force is represented by the following equation (14).

[Expression 18]

$$RF_{SAT}[kgf] \approx M_{SAT}[kgfm] \div L_{kn}[m] \quad (14)$$

The above equation (13) is substituted into the above equation (14). Here, when the sideslip angle is small and $$\cos\alpha \approx 1, \sin\alpha \approx 0 \quad \text{[Expression 19]}$$

is satisfied, $$CF[kgf] \approx TF_y[kgf] \quad \text{[Expression 20]}$$

is satisfied. As a result, the following equation (15), which is a relational equation related to a change in force, can be obtained.

[Expression 21]

$$RF_{SAT}[kgf] \cong CF[kgf] \times \frac{(t_p[m] + t_c[m]) \times \sin\beta}{L_{kn}[m]} \quad (15)$$

The following equation (16) can be obtained by simultaneously rearranging the relational equation of the above equation (11) and the above equation (15) for CF.

[Expression 22]

$$RF_{SAT}[kgf] \cong (f_{DFfr}(K_1 \times \omega_{roll}[\deg/\sec], i_{Dfr}) + K_{fr} \times K_1 \times \theta_{roll}[\deg]) \times \quad (16)$$
$$(t_p[m] + t_c[m]) \times \frac{TW[m] \times \sin\beta}{a \times H_g[m] \times L_{kn}[m]}$$

By using the above equation (16), the rack axial force estimation unit 621 can input the roll rate, the roll angle, and the coefficient corresponding to the vehicle 900 and can output an estimated rack axial force. The estimated rack axial force (roll rate-related estimated rack axial force) related to the roll rate, which is estimated by the roll rate-related rack axial force estimation unit 629, corresponds to, in the above equation (16), the following equation.

[Expression 23]

$$f_{DFfr}(K_1 \times \omega_{roll}[\deg/\sec], i_{Dfr}) \times \frac{TW[m] \times \sin\beta}{a \times H_g[m] \times L_{kn}[m]}$$

An estimated rack axial force (roll angle-related estimated rack axial force) related to the roll angle, which is estimated by the roll angle-related rack axial force estimation unit 6251 described below, corresponds to, in the above equation (16), the following equation.

[Expression 24]

$$K_{fr} \times K_1 \times \theta_{roll}[\deg] \times \frac{TW[m] \times \sin\beta}{a \times H_g[m] \times L_{kn}[m]}$$

The correction coefficient determined by the first constant gain application unit 624 and the second constant gain application unit 626 described below corresponds to, in the above equation (16),

[Expression 25]

$$\frac{TW[m] \times \sin\beta}{a \times H_g[m] \times L_{kn}[m]}$$

the above equation.

The adding unit 627 calculates the roll-related estimated rack axial force by calculating the roll rate-related estimated rack axial force supplied from the first constant gain application unit 624 and the roll angle-related estimated rack axial force supplied from the second constant gain application unit 626.

The rack axial force estimation unit 621 according to the embodiment may be configured to further include a trail map application unit as a configuration for correcting the roll-related estimated rack axial force output from the adding unit 627. The correction coefficient determined by the trail map application unit corresponds to, in the above equation (16), $t_p[m]+t_c[m]$                  [Expression 26]

the above equation.
(Suspension Control Unit)

Figure 8:
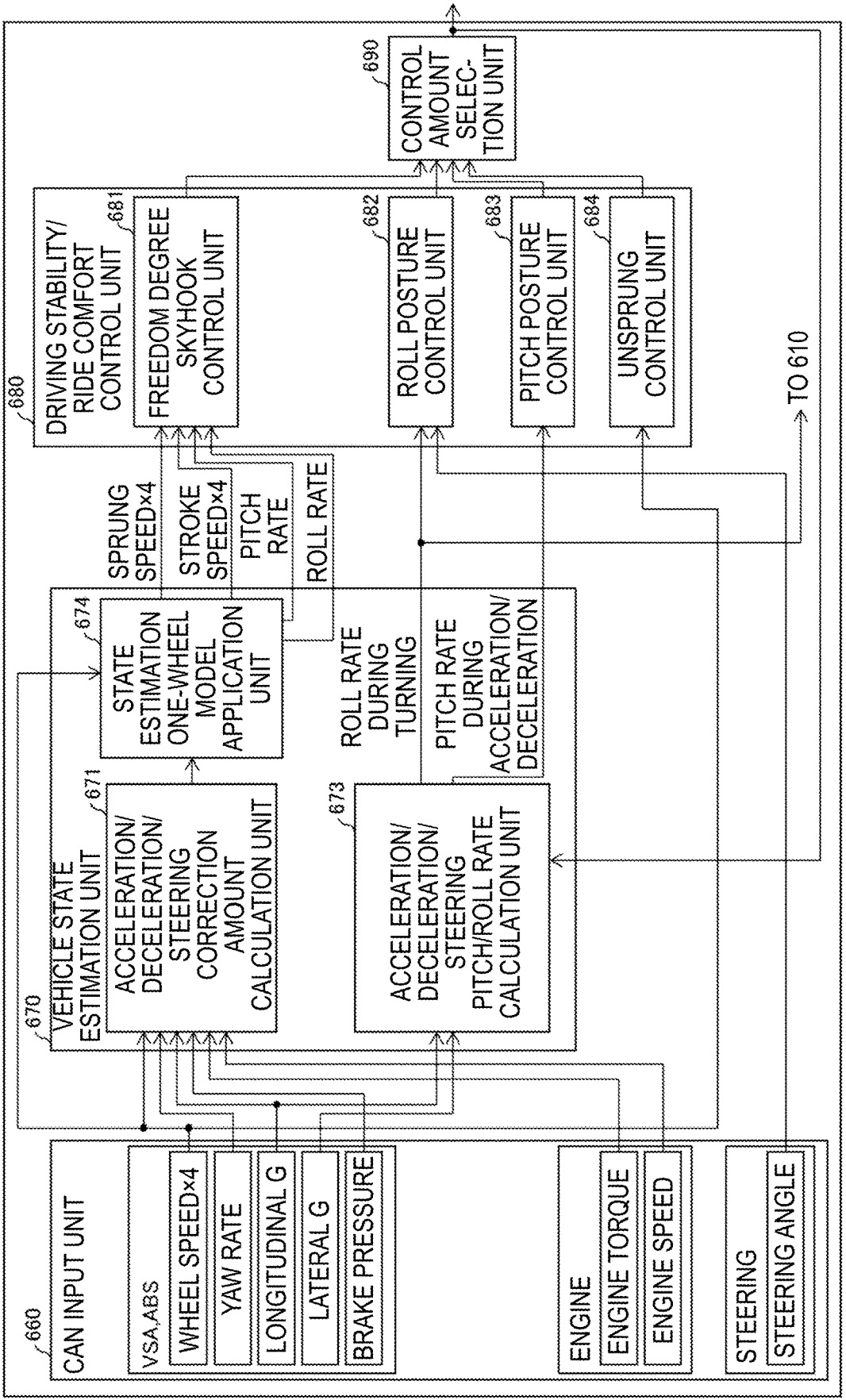
FIG. 8 is a block diagram illustrating a configuration example of a suspension control unit according to the first embodiment of the invention.

Next, the suspension control unit will be described with reference to FIG. 8. FIG. 8 is a block diagram illustrating a configuration example of the suspension control unit 650.

As illustrated in FIG. 8, the suspension control unit 650 includes a CAN input unit 660, a vehicle state estimation unit 670, a driving stability/ride comfort control unit 680, and a control amount selection unit 690.

The CAN input unit 660 acquires various signals via the CAN 370. As illustrated in FIG. 8, the CAN input unit 660 acquires the following signals (parentheses indicate acquisition sources).

Four wheel speeds (wheel speed sensors 320A to 320D)
Yaw rate (yaw rate sensor 350)
Longitudinal G (longitudinal G sensor 340)
Lateral G (lateral G sensor 330)
Brake pressure (brake pressure sensor 530)
Engine torque (engine torque sensor 510)
Engine speed (engine speed sensor 520)
Steering angle (steering angle sensor 440)

The vehicle state estimation unit 670 estimates the state of the vehicle 900 with reference to various signals acquired by the CAN input unit 660. The vehicle state estimating unit 670 outputs the sprung speed of the four wheels, the stroke speed of the four wheels, the pitch rate, the roll rate, the roll rate during turning, and the pitch rate during acceleration/deceleration as the estimation result.

As illustrated in FIG. 8, the vehicle state estimating unit 670 includes an acceleration/deceleration/steering correction amount calculation unit 671, an acceleration/deceleration/steering pitch/roll rate calculation unit 673, and a state estimation one-wheel model application unit 674.

The acceleration/deceleration/steering correction amount calculation unit 671 calculates the vehicle body longitudinal speed, the inner and outer wheel difference ratio, and the adjustment gain with reference to the yaw rate, the longitudinal G, the wheel speed of the four wheels, the brake pressure, the engine torque, and the engine speed and supplies the calculation result to the state estimation one-wheel model application unit 674.

The acceleration/deceleration/steering pitch/roll rate calculation unit 673 calculates the roll rate during turning and the pitch rate during acceleration/deceleration with reference to the longitudinal G and lateral G. The calculation result is supplied to the state estimation one-wheel model application unit 674.

The acceleration/deceleration/steering pitch/roll rate calculation unit 673 supplies the calculated roll rate during turning to the steering control unit 610 as a roll rate value. The acceleration/deceleration/steering pitch/roll rate calculation unit 673 may be configured to further refer to the suspension control amount output from the control amount selection unit 690. Details of the acceleration/deceleration/steering pitch/roll rate calculation unit 673 will be described below with reference to another drawing.

As described above, the acceleration/deceleration/steering pitch/roll rate calculation unit 673 supplies the roll rate during turning which is calculated with reference to the longitudinal G and the lateral G to the steering control unit 610 as a roll rate value and the steering control unit 610 refers to the roll rate value and corrects a control amount for controlling the magnitude of the assist torque or the reaction torque. Therefore, the steering control unit 610 can more suitably correct the magnitude of the assist torque or the reaction torque.

As described above, when the acceleration/deceleration/steering pitch/roll rate calculation unit 673 is configured to further refer to the suspension control amount output from the control amount selection unit 690, the steering control unit 610 can more suitably correct the magnitude of the assist torque or the reaction torque.

The state estimation one-wheel model application unit 674 refers to the calculation result by the acceleration/deceleration/steering correction amount calculation unit 671, applies the one-wheel model for state estimation to each wheel, and calculates the sprung speed of the four wheels, the stroke speed, the pitch rate, and the roll rate of the four wheels. The calculation result is supplied to the driving stability/ride comfort control unit 680.

The driving stability/ride comfort control unit 680 includes a skyhook control unit 681, a roll posture control unit 682, a pitch posture control unit 683, and an unsprung control unit 684.

The skyhook control unit 681 performs ride comfort control (vibration prevention control) which prevents vehicle sway when overcoming road irregularities and enhances ride comfort. As an example, the skyhook control unit 681 determines the skyhook target control amount with reference to the sprung speed of the four wheels, the stroke speed, the pitch rate, and the roll rate of the four wheels and supplies the result to the control amount selection unit 690.

As a more specific example, the skyhook control unit 681 sets the damping force base value by referring to the sprung-damping force map based on the sprung speed. The skyhook control unit 681 calculates a skyhook target damping force by multiplying the set damping force base value by a skyhook gain. Then, a skyhook target control amount is determined based on the skyhook target damping force and the stroke speed.

The roll posture control unit 682 performs roll posture control with reference to the roll rate during turning and the steering angle. The roll posture control unit 682 determines a steering angle proportional target control amount, which is a target control amount according to the steering angle, a steering angular speed proportional target control amount, which is the target control amount according to the steering angular speed, and a roll rate proportional target control amount, which is a target control amount according to the roll rate and supplies the result to the control amount selection unit 690

The roll posture control unit 682 may be configured to calculate the various target control amounts with reference to a steering torque signal indicating the steering torque. Here, the steering control unit 610 may supply a steering torque signal to the suspension control unit 650 and the steering control unit 610 may refer to the steering torque signal. The steering torque signal may be configured to use a phase-compensated signal. As a result, it is expected that a more comfortable ride can be realized.

As described above, since the roll posture control unit 682 performs the roll posture control with reference to the roll rate at the time of turning calculated by the acceleration/deceleration/steering pitch/roll rate calculation unit 673, it is possible to perform suitable attitude control. The roll rate during turning calculated by the acceleration/deceleration/steering pitch/roll rate calculation unit 673 is used not only for the roll posture control by the roll posture control unit 682 but also for the correction of the magnitude of the assist torque or the reaction torque by the steering control unit 610 as described above. Therefore, it is possible to provide a suitable attitude control and a steering feeling without a sense of incompatibility while preventing an increase in the number of components.

The pitch posture control unit 683 performs pitch control with reference to the pitch rate during acceleration and deceleration, determines a pitch target control amount, and supplies the result to the control amount selection unit 690.

The unsprung control unit 684 performs unsprung vibration prevention control of the vehicle 900 with reference to the wheel speeds of the four wheels and determines a target control amount of unsprung vibration prevention control. The decision result is supplied to the control amount selection unit 690.

The control amount selection unit 690 outputs the target control amount having the largest value among the skyhook target control amount, the steering angle proportional target control amount, the steering angular speed proportional target control amount, the roll rate proportional target control amount, the pitch target control amount, and the unsprung vibration prevention control target control amount as the suspension control amount.

The damping characteristic of the hydraulic shock absorber changes based on the suspension control amount and the damping force of the suspension is controlled.

Second Embodiment

Hereinafter, a second embodiment of the invention will be described. In the following description, the similar members as those already described are denoted by the same reference numerals and description thereof will be omitted.

The correction amount calculation unit 620 according to the embodiment uses the roll rate output from the vehicle state estimation unit 670 of the suspension control unit 650 as an input to the roll rate-related rack axial force estimation unit 629 in place of the roll rate supplied from the roll rate sensor in the correction amount calculation unit 620 according to the first embodiment. As described in the first embodiment, this roll rate is calculated from the control amount for controlling the damping force of the suspension and the lateral G (lateral acceleration) of the vehicle and is an estimated value referred to determine the control amount for controlling the damping force of the suspension.

The correction amount calculation unit 620 according to the embodiment uses a roll angle obtained by integrating the roll rate instead of the roll angle supplied from the roll angle sensor as an input to the roll angle-related suspension damping force estimation unit 625. Examples of the roll rate to be integrated here include a roll rate supplied from a roll rate sensor, a roll rate output from the vehicle state estimation unit 670, and the like.

The torque loss estimation unit 630 according to the embodiment uses the roll rate output by the vehicle state estimation unit 670 of the suspension control unit 650 as an input to the roll rate determination unit 633 instead of the roll rate supplied from the roll rate sensor in the torque loss estimation unit 630 according to the first embodiment.

The steering control unit 610 according to the embodiment can estimate the direction in which the vehicle body 200 is rolling by estimating the rack axial force with reference to the roll rate of the vehicle body 200 when the torque loss estimation unit 630 estimates the torque loss. Therefore, the steering control unit 610 can identify roll changes in a transient state of the vehicle body 200. As described above, the control amount correction unit 612 corrects the control amount calculated by the base control amount calculation unit 611 according to the roll change in the transient state of the vehicle body 200, in such a manner that an assist torque or a reaction torque with less discomfort for a driver can be applied to steering member 410.

Third Embodiment

Hereinafter, a third embodiment of the invention will be described. In the following description, the similar members as those already described are denoted by the same reference numerals and description thereof will be omitted.

The correction amount calculation unit 620 according to the embodiment uses the roll rate output by the vehicle state estimation unit 670 of the suspension control unit 650 as an input to the roll rate-related rack axial force estimation unit 629, similarly to the correction amount calculation unit 620 according to the second embodiment. The correction amount calculation unit 620 according to the embodiment uses a suspension control current as a suspension control amount supplied from the suspension control unit 650 as an input to the roll rate-related rack axial force estimation unit 629, similarly to the correction amount calculation unit 620 according to the second embodiment. The correction amount calculation unit 620 according to the embodiment uses the roll angle obtained by integrating the roll rate as an input to the roll angle-related suspension damping force estimation unit 625, similarly to the correction amount calculation unit 620 according to the second embodiment.

Figure 9:
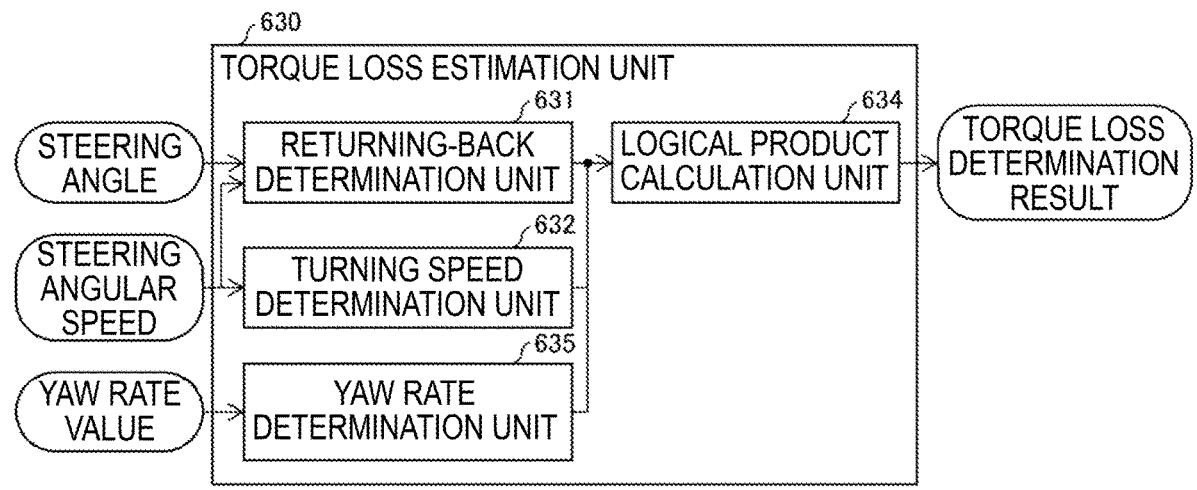
FIG. 9 is a block diagram illustrating a configuration example of a torque loss estimation unit according to a third embodiment of the invention.

Next, the torque loss estimation unit 630 according to the embodiment will be described with reference to FIG. 9. FIG. 9 is a block diagram illustrating a configuration example of the torque loss estimation unit according to the embodiment. The torque loss estimation unit 630 according to the embodiment has a configuration in which a yaw rate determination unit 635 is provided instead of the roll rate determination unit 633 in the torque loss estimation unit 630 according to the first embodiment. The torque loss estimation unit 630 estimates a torque loss with reference to the yaw rate, the steering angle, and the steering angular speed.

The yaw rate determination unit 635 determines whether the yaw rate value supplied from the yaw rate sensor 350 or its absolute value is less than a predetermined value. The yaw rate determination unit 635 outputs "1" as a determination result when the yaw rate value or its absolute value is less than a predetermined value and outputs "0" as a determination result otherwise.

The logical product calculation unit 634 calculates the logical product of the determination results from the returning-back determination unit 631, the turning speed determination unit 632, and the yaw rate determination unit 635 and outputs the result. In other words, the logical product calculation unit 634 outputs "1" when the determination results output from the returning-back determination unit 631, the turning speed determination unit 632, and the yaw rate determination unit 635 are all "1" and outputs "0" otherwise.

The torque loss estimation unit 630 estimates torque loss when the determination result output by the logical product calculation unit 634 is "1" and does not estimate torque loss when the determination result output by the logical product calculation unit 634 is "0". As described above, the torque loss estimation unit 630 estimates the torque loss when it is in the returning-back state, the steering wheel speed is equal to or higher than the predetermined value, and the yaw rate is lower than the predetermined value.

The torque loss estimation unit 630 according to the embodiment may be configured to perform torque loss estimation using the lateral G instead of or together with the yaw rate. Here, the torque loss estimation unit 630 includes a lateral G determination unit instead of or together with the yaw rate determination unit 635. The torque loss estimation unit 630 estimates a torque loss with reference to the lateral G, the steering angle, and the steering angular speed.

The lateral G determination unit determines whether the lateral G value supplied from the lateral G sensor 330 or its absolute value is less than a predetermined value. The lateral G determination unit outputs "1" as the determination result when the lateral G value or its absolute value is less than a predetermined value and outputs "0" as the determination result otherwise.

When the torque loss estimation unit 630 performs the torque loss estimation using the lateral G, if it is in the returning-back state, the steering angular speed is equal to or more than the predetermined value, and the lateral G is less than the predetermined value, the torque loss estimation unit 630 estimates that it is the torque loss.

In this way, the steering control unit 610 according to the embodiment is configured such that the torque loss estimation unit 630 estimates the torque loss based on sensor signals supplied from various sensors and the correction amount calculation unit 620 calculates a correction amount based on a suspension control signal supplied from the suspension control unit 650.

The steering control unit 610 according to the embodiment can estimate the direction in which the vehicle body 200 is rolling by estimating the rack axial force with reference to the roll rate of the vehicle body 200 when the torque loss estimation unit 630 estimates the torque loss. Therefore, transient roll changes of the vehicle body 200 can be identified. In this way, the control amount correction unit 612 corrects the control amount calculated by the base control amount calculation unit 611 according to the roll change in the transient state of the vehicle body 200, so that the assist torque or the reaction torque with less discomfort for a driver can be applied to the steering member 410.

[Example Implemented by Software]

The control block (steering control unit 610, suspension control unit 650) of the ECU 600 may be realized by a logic circuit (hardware) formed in an integrated circuit (IC chip) or the like or may be realized by software using a central processing unit (CPU).

In the latter case, the ECU 600 includes a CPU which executes instructions of a program which is software for realizing each function, a read only memory (ROM) or a storage device (these are referred to as "recording media") in which the program and various data are recorded to be readable by a computer (or a CPU), a random access memory (RAM) for expanding the above programs, and the like. Then, the object of the invention is achieved when the computer (or CPU) reads the program from the recording medium and executes the program. As the recording medium, a "non-transitory tangible medium", for example, a tape, a disk, a card, a semiconductor memory, a programmable logic circuit, or the like can be used. The program described above may be supplied to the computer via an arbitrary transmission medium (a communication network, a broadcast wave, or the like) capable of transmitting the program. The invention can also be realized in the form of a data signal embedded in a carrier wave, in which the program is embodied by electronic transmission.

The invention is not limited to the above embodiments and various modifications are possible within the scope illustrated in the claims. Embodiments obtained by appropriately combining technical means disclosed in different embodiments are also included in the technical scope of the invention.

REFERENCE SIGNS LIST

200 vehicle body
600 ECU (control device)
610 steering control unit
611 base control amount calculation unit 612 control amount correction unit
620 correction amount calculation unit
621 rack axial force estimation unit
622 axial force correction current calculation unit
623 suspension damping force estimation unit
625 roll angle-related suspension damping force estimation unit
6251 roll angle-related rack axial force estimation unit
627 roll-related rack axial force estimation unit (adding unit)
629 roll rate-related rack axial force estimation unit
630 torque loss estimation unit
900 vehicle

The invention claimed is:

1. A steering control device of a steering device including a torque application unit which applies an assist torque or a reaction torque to a steering member operated by a driver, the steering control device comprising:
a torque loss estimation unit which estimates torque loss;
a rack axial force estimation unit which calculates an estimated value of a suspension damping force with reference to a roll rate of a vehicle body, and estimates a rack axial force from the estimated value of the suspension damping force; and
a correction amount calculation unit which calculates a correction amount according to the rack axial force estimation value when the torque loss estimation unit estimates the torque loss.

2. The steering control device according to claim 1, wherein
the correction amount calculation unit calculates the correction amount according to the rack axial force estimation value with further reference to a damping coefficient-related value.

3. The steering control device according to claim 2, wherein
the damping coefficient-related value input to the correction amount calculation unit is a control amount for controlling the suspension damping force.

4. The steering control device according to claim 2, wherein
the correction amount calculation unit calculates the correction amount so that a reaction force applied to the steering member increases.

5. The steering control device according to claim 2, wherein
the correction amount calculation unit estimates the rack axial force when the torque loss is estimated.

6. The steering control device according to claim 2, wherein
the correction amount calculation unit acquires the roll rate calculated from a control amount for controlling the suspension damping force and a lateral acceleration of a vehicle.

7. The steering control device according to claim 2, wherein
the roll rate input to the correction amount calculation unit is a roll rate referred for determining a control amount for controlling the suspension damping force.

8. The steering control device according to claim 1, wherein
the correction amount calculation unit calculates the correction amount so that a reaction force applied to the steering member increases.

9. The steering control device according to claim 1, wherein
the correction amount calculation unit estimates the rack axial force when the torque loss is estimated.

10. The steering control device according to claim 1, wherein
the correction amount calculation unit acquires the roll rate calculated from a control amount for controlling the suspension damping force and a lateral acceleration of a vehicle.

11. The steering control device according to claim 1, wherein
the roll rate input to the correction amount calculation unit is a roll rate referred for determining a control amount for controlling the suspension damping force.

12. The steering control device according to claim 1, wherein
the torque loss estimation unit estimates the torque loss with reference to the roll rate, a steering angular speed, and a steering angle.

13. The steering control device according to claim 12, wherein
the torque loss estimation unit estimates the torque loss when the steering member is in a returning-back state, the steering angular speed is equal to or higher than a predetermined value, and the roll rate is lower than a predetermined value.

14. The steering control device according to claim 12, wherein
the torque loss estimation unit acquires the roll rate calculated from the control amount for controlling the suspension damping force and a lateral acceleration of a vehicle.

15. The steering control device according to claim 12, wherein
the roll rate input to the torque loss estimation unit is a control amount referred for determining the suspension damping force.

16. The steering control device according to claim 1, wherein
the torque loss estimation unit estimates the torque loss with reference to a yaw rate, a steering angular speed, and a steering angle.

17. The steering control device according to claim 16, wherein
the torque loss estimation unit estimates the torque loss when the steering member is in a returning-back state, the steering angular speed is equal to or higher than a predetermined value, and the yaw rate is lower than a predetermined value.

18. The steering control device according to claim 1, wherein
the torque loss estimation unit estimates the torque loss with reference to a lateral acceleration of a vehicle, a steering angular speed, and a steering angle.

19. The steering control device according to claim 18, wherein
the torque loss estimation unit estimates that the torque loss occurs when the steering member is in a returning-back state, the steering angular speed is equal to or higher than a predetermined value, and the lateral acceleration of the vehicle is lower than a predetermined value.

20. A steering device which includes a steering member operated by a driver, a torque application unit which applies an assist torque or a reaction torque to the steering member, and a steering control unit, wherein the steering control unit includes
a torque loss estimation unit which estimates torque loss,
a rack axial force estimation unit which calculates an estimated value of a suspension damping force with reference to a roll rate of a vehicle body, and estimates a rack axial force from the estimated value of the suspension damping force,
a correction amount calculation unit which calculates a correction amount according to the rack axial force estimation value when the torque loss estimation unit estimates the torque loss,
a base control amount calculation unit which calculates a base control amount with reference to a steering torque applied to the steering member and a vehicle speed, and
a control amount correction unit which corrects the base control amount calculated by the base control amount calculation unit with reference to the correction amount calculated by the correction amount calculation unit, and calculates a steering control amount for supplying to the torque application unit.

\* \* \* \* \*